United States Patent
Gong

(10) Patent No.: US 9,668,243 B1
(45) Date of Patent: May 30, 2017

(54) MULTIPLE-CHANNEL DOWNLINK TRANSMISSION FOR ORTHOGONAL FREQUENCY-DIVISION MULTIPLE ACCESS

(71) Applicant: Google Inc., Mountain View, CA (US)

(72) Inventor: Xiaohong Gong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 14/585,584

(22) Filed: Dec. 30, 2014

Related U.S. Application Data

(60) Provisional application No. 61/928,224, filed on Jan. 16, 2014.

(51) Int. Cl.
*H04W 72/04* (2009.01)
*H04W 74/04* (2009.01)
*H04W 74/00* (2009.01)

(52) U.S. Cl.
CPC ....... *H04W 72/04* (2013.01); *H04W 72/0406* (2013.01); *H04W 72/0453* (2013.01); *H04W 74/006* (2013.01); *H04W 74/04* (2013.01)

(58) Field of Classification Search
CPC . H04W 72/00; H04W 72/04–72/0453; H04W 72/1289; H04W 74/006; H04W 74/04
See application file for complete search history.

(56) References Cited

U.S. PATENT DOCUMENTS

| | | | |
|---|---|---|---|
| 2009/0196364 A1* | 8/2009 | Nakajima | H04W 28/065 375/260 |
| 2013/0229996 A1* | 9/2013 | Wang | H04W 72/0413 370/329 |

* cited by examiner

*Primary Examiner* — Timothy J Weidner
(74) *Attorney, Agent, or Firm* — Honigman Miller Schwartz and Cohn LLP

(57) ABSTRACT

A method includes determining a total bandwidth for a downlink communication, segmenting the downlink communication into data units and assigning the data units to channels assigned to stations of a basic service set. The method also includes transmitting a channel announce frame to stations of the basic service set. The channel announce frame indicates each station assigned to receive a corresponding data unit, and one or more channels assigned to each station for transmitting the corresponding data unit. The method further includes transmitting the corresponding data units over the assigned channels to the assigned stations in a single downlink communication.

24 Claims, 6 Drawing Sheets

MULTIPLE-CHANNEL DOWNLINK TRANSMISSION FOR ORTHOGONAL FREQUENCY-DIVISION MULTIPLE ACCESS

CROSS REFERENCE TO RELATED APPLICATIONS

This U.S. patent application claims priority under 35 U.S.C. §119(e) to U.S. Provisional Application 61/928,224, filed on Jan. 16, 2014, which is hereby incorporated by reference in its entirety.

TECHNICAL FIELD

This disclosure relates to downlink transmissions for an orthogonal frequency-division multiple access procedure on multiple channels.

BACKGROUND

The existing 802.11 media access control (MAC) architecture supports half-duplex communication. In half-duplex communication, a device (e.g., a wireless access point ("AP") or an enrollee station ("STA")) can only transmit or receive during an interval. In full duplex communication (also referred to as "double-duplex" communication), an AP and a STA can communicate in both directions at the same time. Put another way, the AP and the STA both transmit and receive data units at the same time.

SUMMARY

One aspect of the disclosure provides a method that includes determining, by a computing device, a total bandwidth for a downlink communication, segmenting, by the computing device, the downlink communication into data units and assigning, by the computing device, the data units to channels assigned to stations of a basic service set. The method also includes transmitting a channel announce frame from the computing device to stations of the basic service set. The channel announce frame indicates each station assigned to receive a corresponding data unit, and one or more channels assigned to each station for transmitting the corresponding data unit. The method further includes transmitting the corresponding data units over the assigned channels to the assigned stations in a single downlink communication.

Implementations of the disclosure may include one or more of the following optional features. In some implementations, the computing device determines a number of the data units for segmenting the downlink communication by dividing the total bandwidth for the downlink communication by a predetermined value corresponding to a channel frequency. In some examples, each data unit is a PHY protocol data unit that includes a media access control point. In some scenarios, one or more of the PHY protocol data units include a padding appended to the end of the corresponding media access control protocol data units. Each station of the basic service set may be configured to communicate with the access point over a primary channel.

In some implementations, transmitting the channel announce frame to stations of the basic service set includes transmitting the channel announce frame to one or more of the stations of the basic service set assigned to receive the corresponding data unit. Optionally, transmitting the channel announce frame to stations of the basic service set further includes transmitting the channel announce frame to at least one of the stations of the basic service set excluded from being assigned to receive a corresponding data unit.

In some examples, assigning the data units to channels assigned to stations of the basic service set includes transmitting a request to send frame from the computing device to one of the stations over all channels of the basic service set, receiving, at the computing device, a clear to send frame from the station indicating one or more channels indicated as being available for transmitting the data units, and assigning, by the computing device, each data unit to one or more of the channels indicated as being available for transmitting the corresponding data unit.

In some implementations, prior to transmitting the corresponding data units, the method further includes receiving short acknowledgments from one or more of the assigned stations over one or more of the assigned channels and determining interference on each assigned station from which a corresponding short acknowledgement is not received. Each short acknowledgement may indicate that the corresponding assigned station received the channel announce frame. In some examples, the method also includes the computing device blocking transmission of the corresponding data units to each assigned station determined to have interference. In some examples, the method optionally includes decoding, by the computing device, the short acknowledgment received over a primary one of the assigned channels when determining interference on one or more of the assigned stations. In other examples, the computing device decodes the short acknowledgements received over all channels when determining interference on one or more of the assigned stations. In some examples, each corresponding data unit transmitted over the assigned channels instructs the corresponding assigned station to transmit one of an immediate block acknowledgement or a delayed block acknowledgement to the computing device. In some implementations, the method further includes, after transmitting the corresponding data units over the assigned channels to the assigned stations, transmitting a block acknowledgement request from the computing device to each assigned station instructed to transmit the delayed block acknowledgement. In some examples, the computing device receives a block acknowledgement over all channels of the basic service set from each of the assigned stations instructed to transmit the delayed block acknowledgement in response to receiving the corresponding block acknowledgement request. Additionally or alternatively, the computing device receives a block acknowledgement over all channels of the basic service set from each of the assigned stations instructed to transmit the immediate block acknowledgement in response to receiving the corresponding data unit.

Another aspect of the disclosure provides an access point including a transmitter, a computing device in communication with the transmitter, and non-transitory memory in communication with the computing device. The non-transitory memory stores instructions that when executed by the computing device cause the computing device to execute operations that include determining a total bandwidth for a downlink communication, segmenting the downlink communication into data units and assigning the data units to channels assigned to stations of a basic service set. The operations also include transmitting a channel announce frame to stations of the basic service set. The channel announce frame indicates each station assigned to receive a corresponding data unit, and one or more channels assigned to each station for transmitting the corresponding data unit. The operations further include transmitting the corresponding data units over the assigned channels to the assigned stations in a single downlink communication.

This aspect may include one or more of the following optional features. In some implementations, the operations further include determining a number of the data units for segmenting the downlink communication by dividing the total bandwidth for the downlink communication by a predetermined value corresponding to a channel frequency. In some examples, each data unit is a PHY protocol data unit that includes a media access control point. In some scenarios, one or more of the PHY protocol data units include a padding appended to the end of the corresponding media access control protocol data units. Each station of the basic service set may be configured to communicate with the access point over a primary channel.

In some implementations, transmitting the channel announce frame to stations of the basic service set includes transmitting the channel announce frame to one or more of the stations of the basic service set assigned to receive the corresponding data unit. Optionally, transmitting the channel announce frame to stations of the basic service set further includes transmitting the channel announce frame to at least one of the stations of the basic service set excluded from being assigned to receive a corresponding data unit.

In some examples, assigning the data units to channels assigned to stations of the basic service set includes transmitting a request to send frame to one of the stations over all channels of the basic service set, receiving a clear to send frame from the station indicating one or more channels indicated as being available for transmitting the data units, and assigning each data unit to one or more of the channels indicated as being available for transmitting the corresponding data unit.

In some implementations, prior to transmitting the corresponding data units, the operations further include receiving short acknowledgments from one or more of the assigned stations over one or more of the assigned channels and determining interference on each assigned station from which a corresponding short acknowledgement is not received. Each short acknowledgement may indicate that the corresponding assigned station received the channel announce frame. In some examples, the operations also include blocking transmission of the corresponding data units to each assigned station determined to have interference. In some examples, the operations optionally include decoding the short acknowledgment received over a primary one of the assigned channels when determining interference on one or more of the assigned stations. In other examples, the operations decode the short acknowledgements received over all channels when determining interference on one or more of the assigned stations. In some examples, each corresponding data unit transmitted over the assigned channels instructs the corresponding assigned station to transmit one of an immediate block acknowledgement or a delayed block acknowledgement to the access point. In some implementations, the operations further include, after transmitting the corresponding data units over the assigned channels to the assigned stations, transmitting a block acknowledgement request to each assigned station instructed to transmit the delayed block acknowledgement. In some examples, the operations further include receiving a block acknowledgement over all channels of the basic service set from each of the assigned stations instructed to transmit the delayed block acknowledgement in response to receiving the corresponding block acknowledgement request. Additionally or alternatively, the operations further include receiving a block acknowledgement over all channels of the basic service set from each of the assigned stations instructed to transmit the immediate block acknowledgement in response to receiving the corresponding data unit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
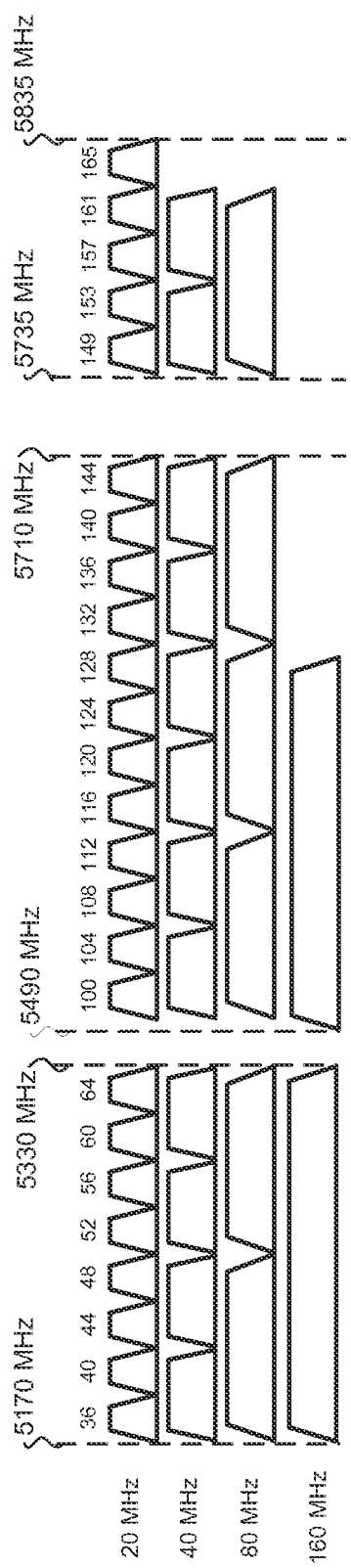
FIG. 1 is a schematic view of an example channelization for an 802.11 media access control architecture.
Figure 2A:
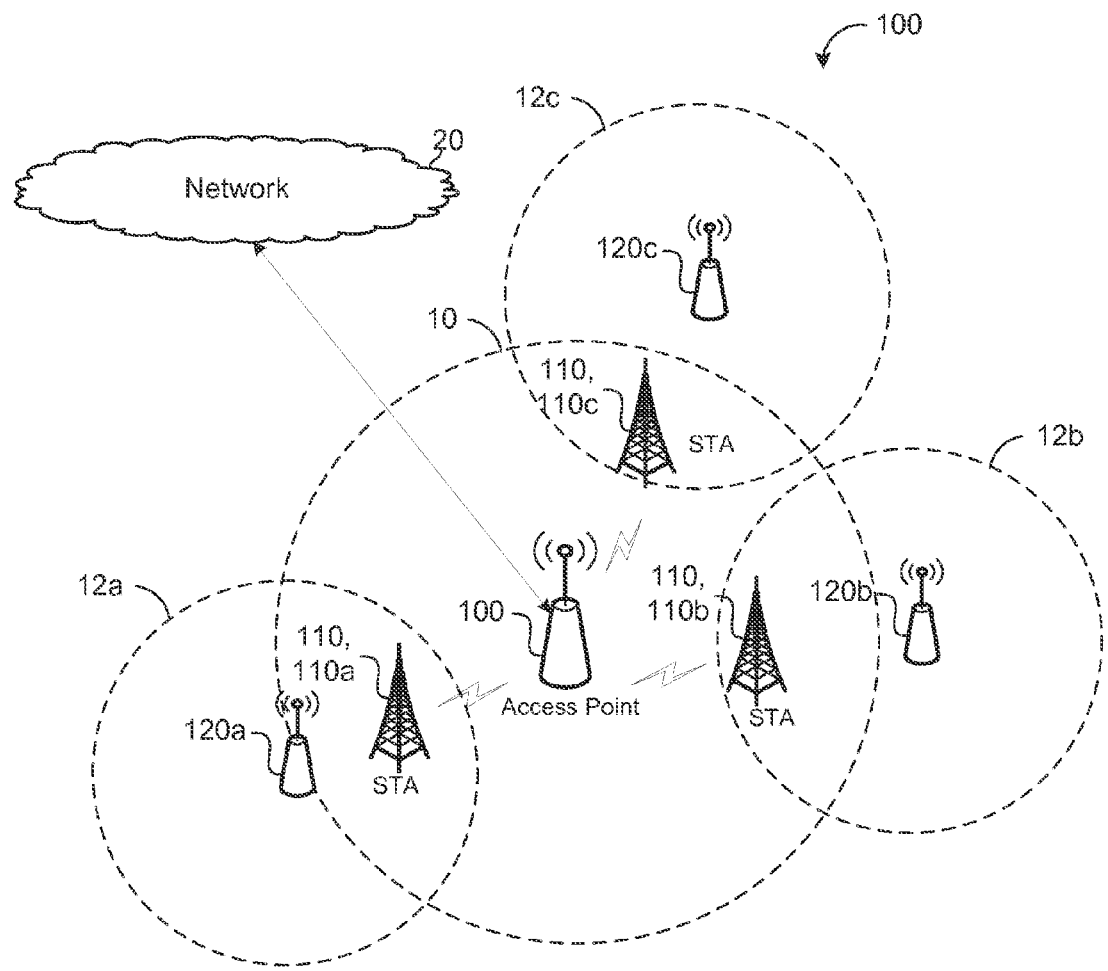
FIG. 2A is a schematic view of an example basic service set including an access point and one or more stations.
Figure 2B:
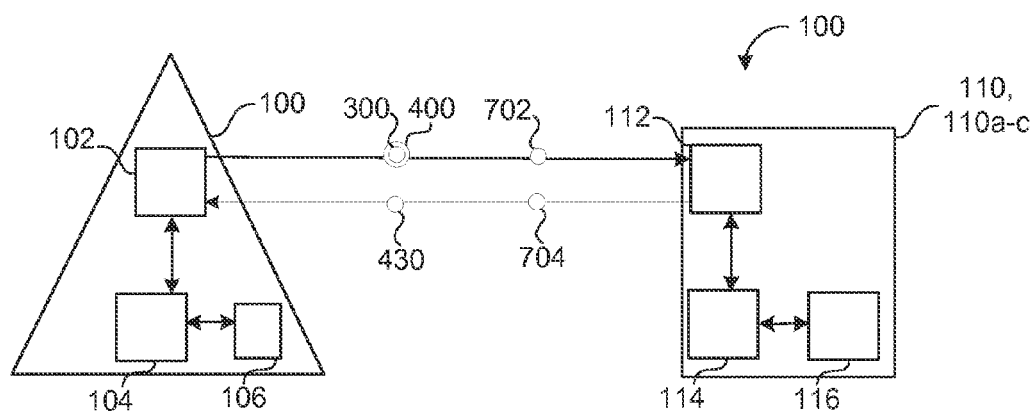
FIG. 2B is a schematic view of example components of the access point and the one or more stations.

Glossary of Abbreviations
AP—Access Point
OFDMA—Orthogonal Frequency-Division Multiple Access
MAC—Media Access Control
A-MPDU—Aggregated MAC Protocol Data Unit
BSS—Basic Service Set
BA—Block Acknowledgment
BAR—Block Acknowledgment Request
CTS—Clear To Send
NAV—Network Allocation Vector
PPDU—PHY Protocol Data Unit
RTS—Request To Send
STA—Enrollee Station
TXOP—Transmit Opportunity Referring to FIGS. 1-2B, in some implementations, an example basic service set (BSS) 10 that includes an access point (AP) 100 in communication with a set of enrollee stations (STA) 110, 110*a-c*. The AP 100 allows a STA 110 to communicate with other devices within the BSS 10 or remote devices outside the BSS 10 via a network 20. In the latter scenario, the AP 100 transmits data to and receives data from the remote devices via the network 20. The AP 100 routes data received from the network 20 to one or more STAs 110 and routes data received from one or more STAs 110 to the network 20. The network 20 may include any type of network that allows sending and receiving of communication signals, such as a wireless telecommunication network, a cellular telephone network, a time division multiple access (TDMA) network, a code division multiple access (CDMA) network, a global system for mobile communications (GSM), a third generation (3G) network, fourth generation (4G) network, a satellite communications network, and any combination thereof.

In some implementations, the AP 100 and the STAs 110 perform communication according to the IEEE 802.11 media access control (MAC) protocol with legacy deployment. In some examples, as shown in FIG. 1, the IEEE 802.11 MAC protocol includes a channelization in a 5 gigahertz (GHz) unlicensed band. For instance, each 40 megahertz (MHz) channel is composed of two adjacent of two adjacent 20 MHz channels, with no partially overlapping 40 MHz channels. Similarly, each 80 MHz channel is composed of two adjacent 40 MHz channels and each 160 MHz channel is composed of two adjacent 80 MHz channels, with no overlapping between the 80 MHz channels and the 160 MHz channels. While IEEE 802.11 is not backward compatible with legacy IEEE 802.11 systems and does not permit partially overlapping channels due to complex co-existence schemes, one 80 MHz channel completely overlaps with two 40 MHz channels and/or four 20 MHz channels. In some implementations, to achieve backward compatibility with an existing IEEE 802.11 MAC protocol, downlink communication bursts are transferred over selected non-overlapping channels rather than over selected sub-carriers. In some examples, the downlink communication bursts correspond to an Orthogonal Frequency-Division Multiple Access (OFDMA) procedure.

Referring to FIG. 2A, the STAs 110a-c belong to the BSS 10 and communicate with the AP 100. However, STA 110a may see interference from AP 120a of BSS 12a may interfere with STA 110a, AP 120b of BSS 12b may interfere with STA 110b, and AP 120c of BSS 12c may interfere with STA 110c. Since multiple BSSs 10, 12a-c may have multiple overlapping radio ranges (e.g., as shown by dotted circles), and may be using overlapping channels (e.g., overlapping 40 MHz and/or 80 MHz channels), co-channel interference from overlapping BSSs may result in different STAs 110a-c experience different interference over different channels.

In some implementations, in a BSS (e.g., BSS 10), there is one primary channel (e.g., 20 MHz channel) and one or more secondary channels (e.g., 20 MHz channels). All STAs 110a-c and the AP 100 are required to be able to communicate over the primary 20 MHz channel. For example, beacons, probe messages, and all broadcast messages are required to be transmitted over the primary 20 MHz channel, while all transmissions that are wider than 20 MHz are required to include the primary 20 MHz channel.

In some scenarios, the one or more of the STAs 110a-c are not configured to perform full-duplex communication and are configured to only perform half-duplex communication. These STAs 110a-c may be referred to as legacy STAs 110. For example, the AP 100 may initiate a transmit opportunity (TXOP) and begins transmitting a channel announce frame 300 to one or more STAs 110a-c over all channels (e.g., first, second, third, and/or fourth 20 MHz channels) prior to or at the beginning of a downlink communication 400 including data units 400a-c destined for one or more STAs 110a-c containing some or all of the data to be transmitted thereto. A TXOP can refer to a bounded time interval during which the AP 100 transmits the channel announce frame 300 and/or more data units 400a-c to one or more the STAs 110a-c. In other words, the AP 100 transmits data units 400a-c destined for corresponding different STAs 110a-c on different channels in a single downlink communication 400 (e.g., OFDMA downlink burst). The AP 100 can be referred to as a TXOP holder and each STA 110 can be referred to as a TXOP responder. The channel announce frame 300 may indicate each STA 110a-c assigned to receive a corresponding data unit 400a-c from the AP 100 and one or more channels (e.g., first, second, third, and/or fourth 20 MHz channels) assigned to each station 110a-c for transmitting the corresponding data unit 400a-c. Each STA 110a-c may receive and decode the channel announce frame 300 and determine whether there is upending corresponding data unit 400a-c to be transmitted from the AP 100 to itself, and if so, on which channel(s) the corresponding data unit 400a-c will be transmitted. The STA 110a-c may then prepare to receive the corresponding data unit 400a-c on the channels indicated in the channel announce frame 300. In some examples, the receiving STA 110 includes an analog filter always set to receive over an entire bandwidth (e.g., 80 MHz) with no center frequency or bandwidth change; however, the receiving STA 110 may include a digital filter that can choose to select one or more channels (20 MHz). In some examples, the digital filter selects a subset of subcarriers output by a Fast Fourier Transform).

Referring to FIG. 2A, the AP 100 includes a transceiver 102, control circuitry (e.g., computing device) 104 that manages communication using the transceiver 102, and non-transitory memory 106 in communication with the control circuitry 104. The non-transitory memory 106 stores information, such as instructions executable by the control circuitry 104, non-transitorily at the control circuitry 104. The non-transitory memory 106 may be a computer-readable medium, a volatile memory unit(s), or non-volatile memory unit(s). The non-transitory memory 106 may be physical devices used to store programs (e.g., sequences of instructions) or data (e.g., program state information) on a temporary or permanent basis for use by the control circuitry 104. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The transceiver 102 can be any suitable device capable of wirelessly receiving data and wirelessly transmitting data. In some implementations, the transceiver 102 includes at least one receiver that receives data wirelessly and at least one transmitter that transmits data wirelessly.

The control circuitry 104 can be, for example, a processor executing computer-readable instructions stored in the non-transitory memory 106, a field programmable gate array (FGPA), a digital signal processor (DSP), or any other suitable circuitry. The control circuitry 104 may determine a total bandwidth for a downlink communication 400, segment the downlink communication 400 into one or more data units 400a-c, and assign the data units 400a-c to channels assigned to STAs 110a-c of the basic service set 10. In some examples, the control circuitry 104 determines a number of data units 400a-c segmented by dividing the total bandwidth of the downlink communication 400 by a predetermined value corresponding to a channel frequency (e.g., 20 MHz). The control circuitry 104 can receive data to be transmitted (e.g., from the network or from a STA 110) and can generate the downlink communication 400 including the data units 400a-c assigned for the corresponding one or more STAs 110a-c containing some or all of the data to be transmitted. In some examples, the data units 400 are PHY protocol data units (PPDU) 400 that may include a PHY header and an aggregated MAC protocol data unit (A-MPDU) 440 (FIG. 4) that includes the payload of the PPDU 400. In some scenarios, a padding 450 (FIG. 4) may be appended to the end of the PPDU 400 as well. The padding 450 can be a variable amount of bits, bytes, or symbols to ensure that the PPDU 400 is of a sufficient size.

The PHY header can contain a plurality of fields including, but not limited to, a destination address field, a source address field indicating a MAC address from which the PPDU 400 is being sent (e.g., the MAC address of the AP 100), and a duration field indicating the remaining duration in the TXOP after transmitting the A-MPDU 440. The PPDU header may further contain whether the AP 100 expects an immediate block acknowledgement (BA) 430 or a delayed BA 430. In some implementations, the control circuitry 104 generates the channel announce frame 300 and the PPDUs 400a-c according to the IEEE 802.11 MAC protocol. In these implementations, when the control circuitry 104 begins transmitting the PPDU 400a-c to an STA 110, the STA 110 can respond by sending a simultaneous or delayed BA 430 duplicated on all channels (e.g., all 20 MHz channels).

In some implementations, the control circuitry 104 initiates a TXOP by transmitting a request to send packet (RTS) 702 to a STA 110. The STA 110 can respond by sending a clear to send packet (CTS) 704 to the AP 100. The control circuitry 104 receives the CTS 704, thereby establishing the TXOP with the STA 110.

The STA 110 can be any type of device that is configured to perform wireless communication. Examples of STAs 110 can include, but are not limited to, laptop computers, personal computers, smartphones, tablet computers, wearable computer devices, gaming consoles, televisions, and smart appliances. A STA 110 includes a transceiver 112 and control circuitry 114. The transceiver 112 can be any suitable device capable of wirelessly receiving data and wirelessly transmitting data. In some implementations, the transceiver 112 includes at least one receiver that receives data wirelessly and at least one transmitter that transmits data wirelessly.

The control circuitry 114 can be, for example, a processor executing computer-readable instructions, a field programmable gate array (FGPA), a digital signal processor (DSP), or any other suitable circuitry. The control circuitry 114 can receive a channel announce frame 300 and data units 400 from the AP 100 and transmit BAs 430 to the AP 100. In some examples, the control circuitry 114 receives a channel announce frame 300 from the AP 100 before the AP 100 transmits each downlink communication 400 (e.g., OFDMA burst) or at the beginning of each TXOP that contains one or more downlink communications 400. In some scenarios, the control circuitry 114 receives a RTS 702 from the AP 100. In response, the control circuitry 114 can transmit a CTS 704 to the AP 100 to establish a TXOP. In this scenario, the STA 110 is the TXOP responder. As the TXOP responder, the control circuitry 114 waits for the channel announce frame 300 from the AP 100, and if applicable, waits for the corresponding PPDU 400a from the AP 100 after receiving and decoding the channel announce frame 300.

Figure 3:
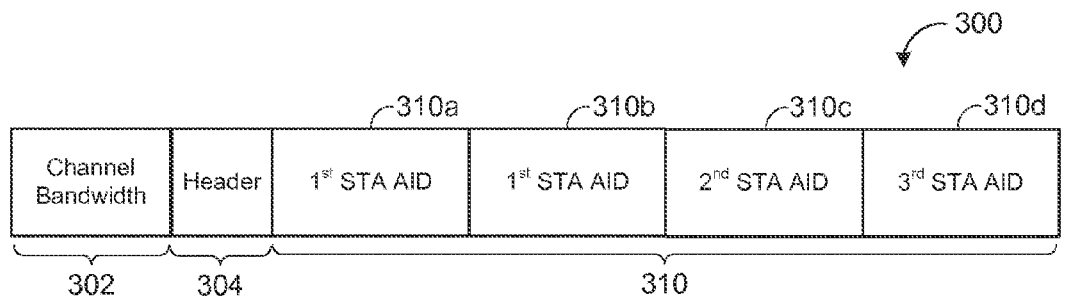
FIG. 3 is a schematic view of an example channel announce frame.

The control circuitry 114 of the STA 110 can further maintain a network allocation vector (NAV) 116. A NAV 116 is a virtual carrier sensing mechanism used within wireless network protocols such as IEEE 802.11 which limits the need for physical carrier sensing at the air interface. When the control circuitry 114 senses that the AP 100 has initiated a TXOP with one or more other devices, the control circuitry 114 can set the NAV 116 such that the control circuitry does not attempt to send or receive until the NAV 116 is reset. For example, when the control circuitry 114 may respond to a corresponding PPDU 400a-c by transmitting a BA 430 duplicated on all channels to ensure that STAs 110 not involved in the downlink communication 400 can correctly reset their NAV 116 regardless of which channels they use FIG. 3 illustrates an example channel announce frame 300. The example channel announce frame 300 indicates an action frame sent from the AP 100 to one or more STAs 110 of the BSS 10 indicating each STA 110 assigned to receive a corresponding data unit 400a-c and one or more channels assigned to each station 110 for transmitting the corresponding data unit 400a-c. As aforementioned, each data unit 400a-c may include a corresponding A-MPDU 440a-c to be transmitted to the assigned STA 110 over the assigned channel(s). The channel announce frame 300 includes a channel bandwidth field 302 indicating the bandwidth of a subsequent downlink communication 400. For example, the channel bandwidth is 80 MHz. The channel announce frame 300 further includes a packet-size field 304 and one or more STA association identifier (AID) fields 310. In the example shown, the channel announce frame 300 includes four STA AID fields 310a-d corresponding to the number of 20 MHz channels on which the AP 100 will transmit the subsequent downlink communication 400. Specifically, each STA AID filed 310a-d indicates the AID of the STA 110 receiving at least a portion of a corresponding data unit 400a-c on the corresponding channel. In the example shown, the first two AID fields 310a, 310b indicate that the STA 110a should prepare to receive a corresponding data unit 400a on both the primary channel 1 (e.g., primary 20 MHz), and on channel 2 (e.g., secondary 20 MHz) channel). The third AID field 310c indicates that the STA 110b should prepare to a receive a corresponding data unit 400b on channel 3 and the fourth AID 310d indicates that the STA 110c should prepare to receive a corresponding data unit 400c on channel 4. The channel announce frame 300 in the example shown, is only exemplary and may include more or less AID fields 310.

FIGS. 4A-4E show examples of the AP 100 transmitting a channel announce frame 300 to STAs 110 prior to transmitting corresponding data units 400a-c over one or more channels assigned to one or more assigned STAs 110a-c in a single downlink communication 400. In the examples shown, each of the channels include 20 MHz channels and the downlink communication 400 includes an 80 MHz bandwidth.

Figure 4A:
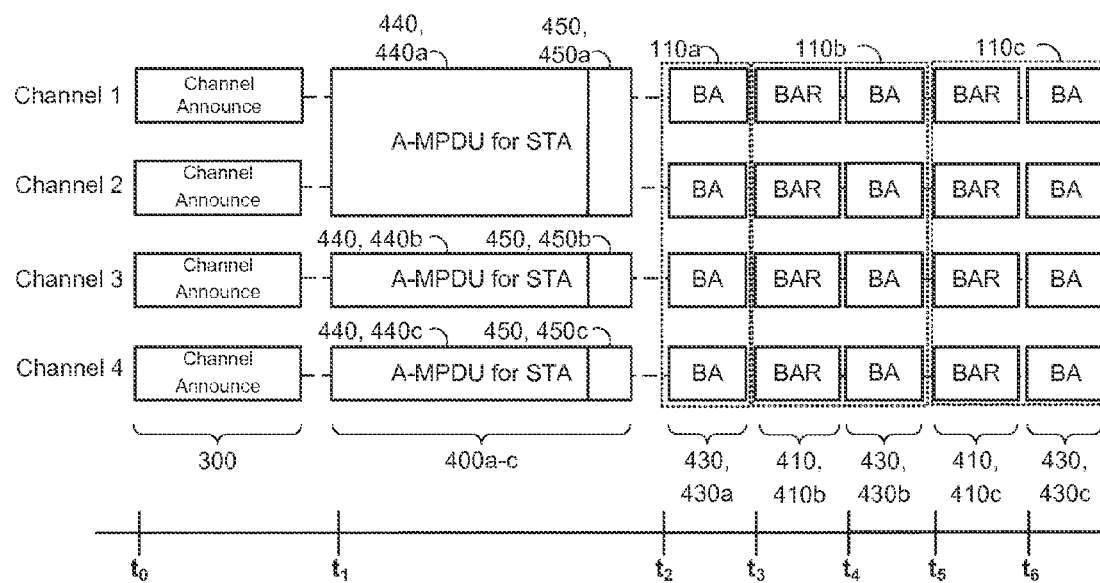
FIGS. 4A-4E are schematic views of example communications between an access point and one or more stations of a basic service set.

FIG. 4A shows an example communication between the AP 100, a first STA 110a, a second STA 110b, and a third STA 110c of a BSS 10. In some implementations, the AP 100 initiates a TXOP by transmitting a channel announce frame 300 duplicated on all channels (e.g., channels 1-4) to the STAs 110a-c at time $t_0$. After receiving and decoding the channel announce frame 300 on the primary channel (e.g., channel 1), the STAs 110a-c determine whether a corresponding data unit 400a-c is to be transmitted from the AP 100, and if so, prepare to receive the corresponding data unit 400a-c on the channels assigned to the each of the STAs 110a-c as indicated in the channel announce frame 300. Subsequently, the AP 100 transmits the corresponding data units 400a-c over the channels assigned to the assigned STAs 110a-in a single downlink communication 400 at $t_1$. In the example shown, the data units 400a-c correspond to PPDUs 400a-c that include corresponding A-MPDUs 440a-c and corresponding padding 450a-c appended to the end of the PPDUs 400a-c. The padding 450a-c may be a same length and the transmission of each of the A-MPDUs 440a-c may overlap in time but not overlap in frequency. In some implementations, the A-MPDUs 440a-c further included a MAC header indicating whether or not the AP 100 expects an immediate BA 430 or a delayed BA 430. In the example shown, the A-MPDU 440a indicates an immediate BA 430 instructing the receiving STA 110a to reply with a BA 430a transmission on all channels (20 MHz) to the AP 100 at t₂. However, the A-MPDU 440b indicates a delayed BA 430 instructing the receiving STA 110b to wait to reply with a BA 430b until it receives a block acknowledgement request (BAR) 410b on the primary channel. Upon receiving the BAR 410b at t₃, the STA 110b transmits the BA 430b on all channels (20 MHz) to the AP 100 at t₄. Likewise, the A-MPDU 440c indicates a delayed BA 430 instructing the STA 110c to wait for the BAR 410c at t₅, before transmitting the BA 430c on all channels to the AP 100 at t₆.

Figure 4B:
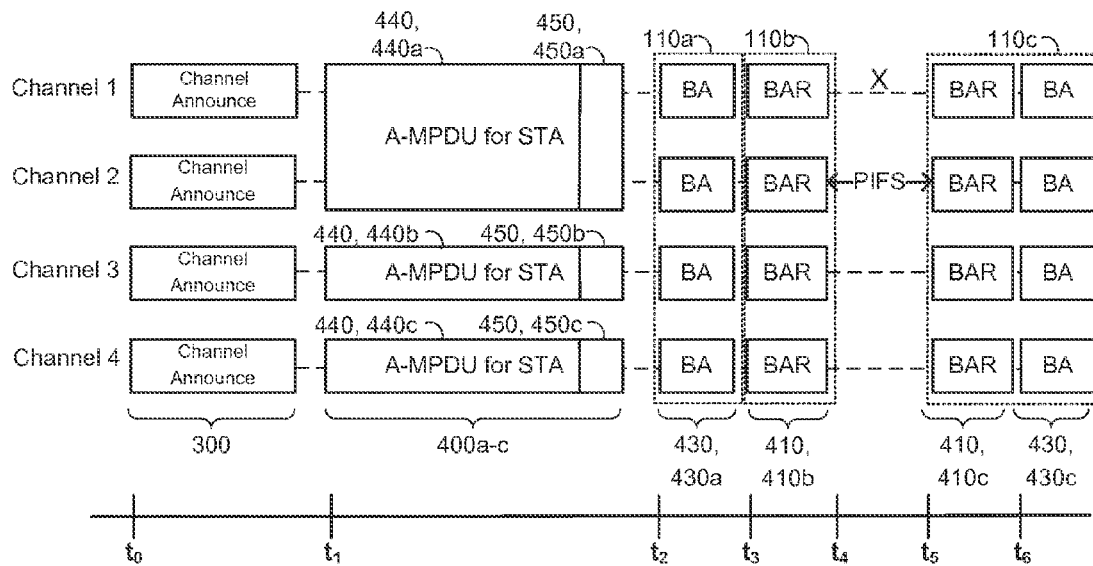

FIG. 4B shows another example communication between the AP 100, the first STA 110a, the second STA 110b, and the third STA 110c. In the example of FIG. 4B, the AP 100 fails to receive a BA 430 from the second STA 110b on the primary channel 1 (e.g., denoted by "X") in response to transmitting the BAR 410b at t3. To recover the remainder of the TXOP in the downlink communication 400, the control circuitry 104 of the AP 100 waits for a point-coordination function interframe space (PIFS) time before transmitting the BAR 410c to the third STA 110c on all channels 1-4 at t₅. Upon receiving the BAR 410c, the third STA 110c may transmit the BA 430c on all channels to the AP 100 at t₆. Since the AP 100 is the TXOP holder, the AP 100 (e.g., control circuitry 104) attempts to recover the remainder of the downlink communication 400 within the PIFS time (e.g., between t₄ and t₅).

Figure 4C:
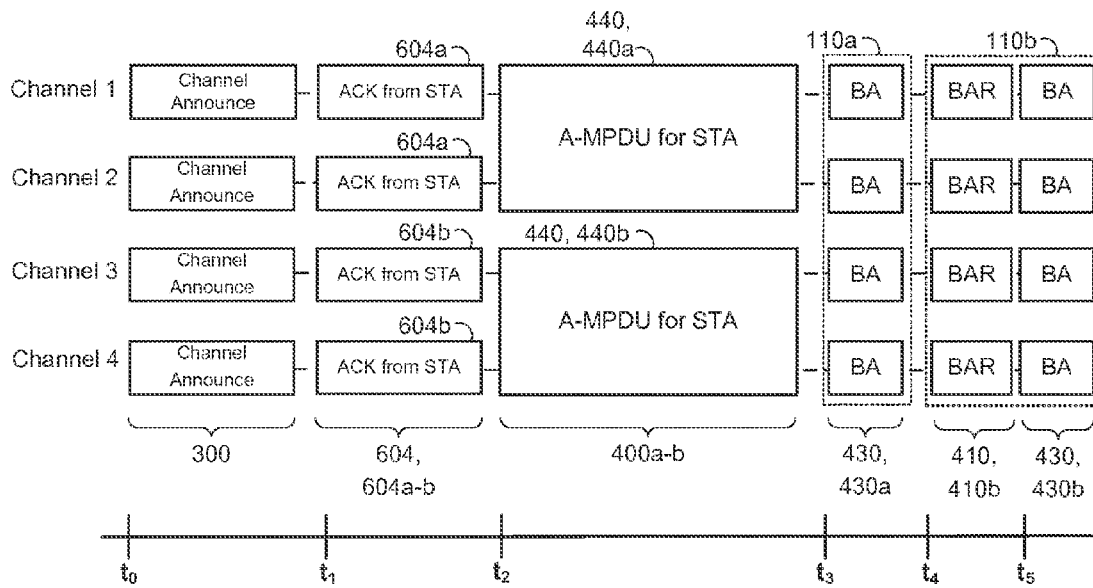

FIG. 4C shows another example communication between the AP 100, the first STA 110a and the second STA 110b when only one primary 20 MHz channel is defined for the BSS 10. After transmitting the channel announce frame 300 duplicated over all four channels, the AP 100 receives a short acknowledgement (ACK) 604 over channels assigned to the STAs 110 assigned to receive a corresponding data unit 400a-b, as indicated by the channel announce frame 300. In other words, the short ACK 604 received by the AP 100 from one of the STAs 110 indicates the corresponding STA 110 received the channel announce frame 300 and able to receive the corresponding data unit 400a-c indicated by the channel announce frame 300. In the example shown, the AP 100, at t₁, receives an ACK 604a from the first STA 110 over channels 1 and 2 and receives an ACK 604b from the second STA 110b over channels 3 and 4. The exchange of the channel announce frame 300 and the ACKs 604a-b provides MAC protection for the downlink communication 400 (e.g., OFDMA burst) to be transmitted and sets the TXOP between the AP 100 and the STAs 110. In some examples, the ACKs 604a-b from the different STAs 110a-b only contain a receive address field, and thus, are exactly the same. In some scenarios, the AP 100 may decode only the ACK 604 transmitted over the primary channel. In other scenarios, the AP 100 may determine all channels for PPDUs 400 and only decode the ACK 604 on the primary channel permitting the AP 100 (e.g., via control circuitry 104) to determine interference on an STA 110 from which an ACK 604 is not received. When interference is indicated on the STA 110, the AP 100 will not transmit any data units 400a-c to that STA 110. In other scenarios, the AP 100 may decode all ACKs 604 on all channels to get the exact information to which an STA 110 has interference, and is therefore, not a suitable recipient of data units 410a-c.

Figure 4D:
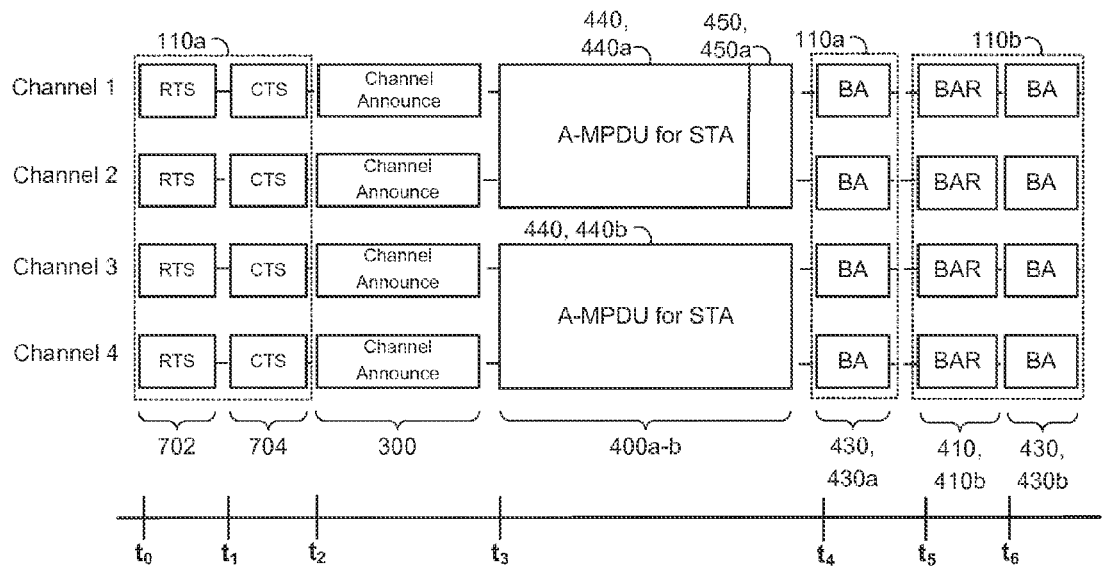

FIG. 4D shows another example of communication between the AP 100, the first STA 110a and the second STA 110b. In the example of FIG. 4D, the AP 100 provides MAC protection by transmitting an RTS 702 to only the first STA 110a over all channels (e.g., Channels 1-4) at t₀. The control circuitry 104 of the AP 100 may assign one STA 110 (e.g., the first STA 110a) for receiving the RTS 702. Upon receiving the RTS 702, the STA 110a transmits a CTS 704 to the AP 100 over all channels (e.g., Channels 1-4) at t₁. Specifically, the STA 110a determines all channels indicated as being available for receiving the downlink communication 400 to set the TXOP and provide MAC protection. Thus, the example shown in FIG. 4D permits the AP 100 to assign one STA 110 (e.g., the first STA 110a) to solicit channel availability information from. The AP 100 may subsequently transmit the channel announce frame 300 duplicated over all the available channels (e.g., Channels 1-4) at time t₂ and transmit the corresponding data units 400a-b over the channels assigned to the assigned STAs 110a-b in a single downlink communication 400 at t₃.

Figure 4E:
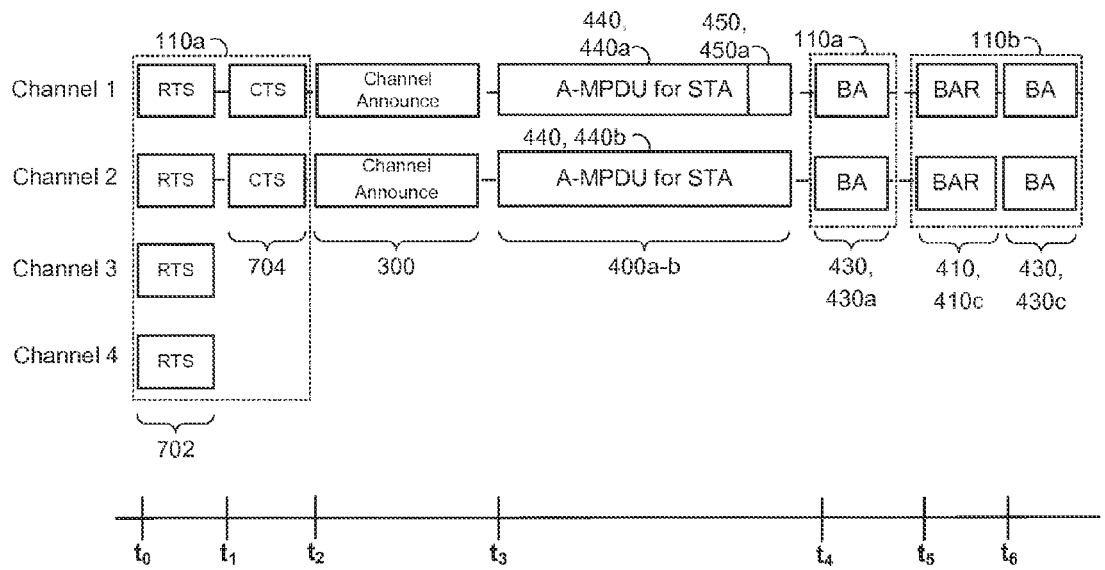

FIG. 4E shows another example where the AP 100 provides MAC protection by transmitting an RTS 702 to only the first STA 110a over all channels (e.g., Channels 1-4) at t₀, but the STA 110a determines only channels 1 and 2 as being available for receiving the downlink communication 400 to set the TXOP and provide mac protection. Accordingly, the STA 110a transmits a CTS 704 to the AP 100 over the available channels (e.g., Channels 1 and 2) at t₁. Accordingly, the AP 100 transmits the channel announce frame 300 duplicated over channels 1 and 2 at t₂ and transmits the corresponding data units 400a-b over the channels (e.g., Channels 1 and 2) assigned to the assigned STAs 110a-b in a single downlink communication 400 at t₃.

Figure 5:
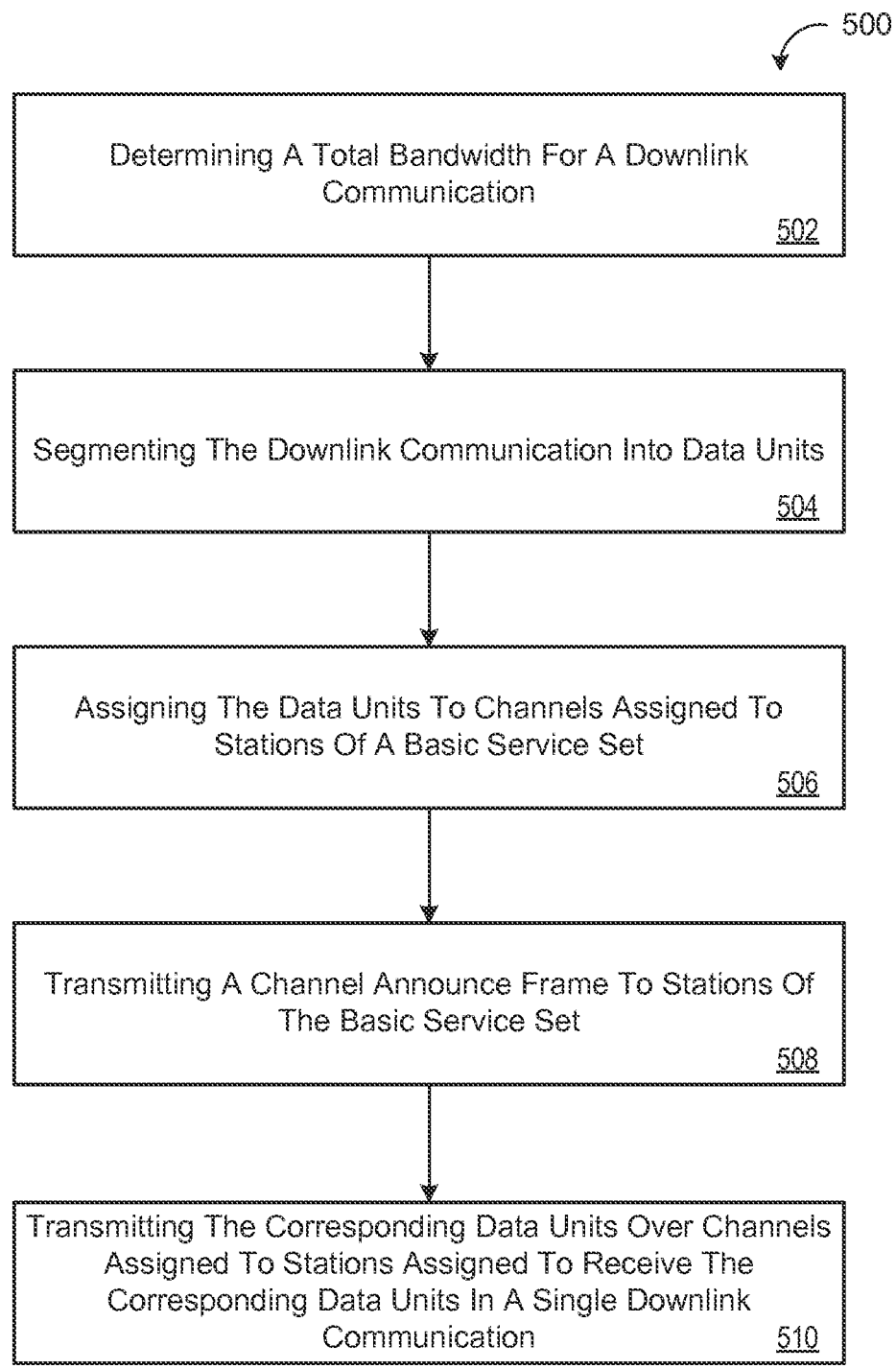
FIG. 5 is an example arrangement of operations for method of transmitting a downlink communication from an access point over one or more channels assigned to one or more stations of a basic service set.

FIG. 5 provides an example arrangement of operations for a method 500 of transmitting a downlink communication from an AP 100 over one or more channels assigned to one or more STAs 110 of a BSS 10. The method 500 may be executed by the control circuitry 104 (e.g., computing device) of the AP 100 when the control circuitry executes instructions stored in the non-transitory memory 106.

At operation 502, the control circuitry 104 of the TXOP holder (e.g., the AP 100) determines a total bandwidth for the downlink communication 400 to be transmitted to one or more STAs 110a-c, and at operation 504, segments the downlink communication into data units 400a-c (e.g., PPDUs 400a-c). In some examples, the number of data units 400a-c segmented by the control circuitry 104 is based on dividing the total bandwidth for the downlink communication 400 by a predetermined value corresponding to a predetermined channel frequency (e.g., 20 MHz). At operation 506, the control circuitry 104, assigns the data units 400a-c to channels assigned to STAs 110a-c of the BSS 10.

At operation 508, the control circuitry 104 transmits a channel announce frame 300 to STAs 110a-c of the BSS 10. The channel announce frame 300 may be duplicated over all channels. The channel announce frame 300 indicates each STA 110 assigned to receive a corresponding data unit 400a-c and one or more channels assigned to each STA 100a-c for transmitting the corresponding data unit 400a-c. The data units 400a-c may be PPDUs 400a-c including a PHY header, an A-MPDU 440a-c, and optionally padding 450a-c appended to the end of the PPDU 400a-c. In some examples, the AP 100 waits for an ACK 604 from the receiving STAs 110 prior to transmitting any data units 400a-c to the STAs 110a-c. In other examples, prior to transmitting the channel announce frame 300, the AP 100 (via the transceiver 102) transmits an RTS 702 to a chosen STA 110 to solicit channel availability information that may be received via a CTS 704 from the chosen STA 110.

At operation 510, the control circuitry 104 transmits the corresponding data units 400a-c over the assigned channels to the assigned STAs 110a-c in a single downlink communication 400. In some implementations, the A-MPDUs 440a-c further include a MAC header indicating whether or not the AP 100 expects an immediate BA 430 or a delayed BA 430. For instance, an A-MPDU 440 indicating an immediate BA 430 results in the receiving STA 110 replying with a BA 430 transmission on all channels (20 MHz) to the AP 100. In some scenarios, an A-MPDU 440 indicating a delayed BA 430 results in the receiving STA 110b waiting for a BAR 410 to be received from the AP 100 on the primary channel before replying with a BA 430 transmission on all channels.

The method 500 of FIG. 5 is provided for example only. Variations of the method 500 are contemplated and are within the scope of the disclosure.

Instructions or a software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   determining, by a computing device, a total bandwidth for a downlink communication;
   segmenting, by the computing device, the downlink communication into data units;
   assigning, by the computing device, the data units to channels assigned to stations of a basic service set;
   transmitting a channel announce frame from the computing device to stations of the basic service set, the channel announce frame indicating:
      each station assigned to receive a corresponding data unit; and
      one or more channels assigned to each station for transmitting the corresponding data unit;
   receiving, at the computing device, short acknowledgements from one or more of the assigned stations over one or more of the assigned channels, each received short acknowledgment indicating the corresponding assigned station received the channel announce frame;
   determining, by the computing device, interference on each assigned station from which a corresponding short acknowledgment is not received;
   blocking, by the computing device, transmission of the corresponding data units to each assigned station determined to have interference; and
   transmitting the corresponding data units over the assigned channels to the unblocked assigned stations in a single downlink communication.

2. The method of claim 1, wherein segmenting the downlink communication into data units comprises dividing the total bandwidth for the downlink communication by a predetermined value corresponding to a channel frequency to determine a number of the data units.

3. The method of claim 1, wherein each data unit is a PHY protocol data unit that comprises a media access control protocol data unit.

4. The method of claim 3, wherein one or more of the PHY protocol data units comprise a padding appended to the end of the corresponding media access control protocol data units.

5. The method of claim 1, wherein each station of the basic service set is configured to communicate with the access point over a primary channel.

6. The method of claim 1, wherein transmitting the channel announce frame to stations of the basic service set comprises transmitting the channel announce frame to one or more of the stations of the basic service set assigned to receive the corresponding data unit.

7. The method of claim 6, wherein transmitting the channel announce frame to stations of the basic service set further comprises transmitting the channel announce frame to at least one of the stations of the basic service set excluded from being assigned to receive a corresponding data unit.

8. The method of claim 1, wherein assigning the data units to channels assigned to stations of the basic service set comprises:
   transmitting a request to send frame from the computing device to one of the stations over all channels of the basic service set;
   receiving, at the computing device, a clear to send frame from the station indicating one or more channels indicated as being available for transmitting the data units; and
   assigning, by the computing device, each data unit to one or more of the channels indicated as being available for transmitting the corresponding data unit.

9. The method of claim 1, further comprising decoding, by the computing device, only the short acknowledgment frame received over a primary one of the assigned channels when determining interference on one or more of the assigned stations.

10. The method of claim 1, further comprising decoding, by the computing device, the short acknowledgements received over all channels when determining interference on one or more of the assigned stations.

11. The method of claim 1, wherein each corresponding data unit transmitted over the assigned channels instructs the corresponding assigned station to transmit one of an immediate block acknowledgement or a delayed block acknowledgement to the access point.

12. The method of claim 11, further comprising, after transmitting the corresponding data units over the assigned channels to the assigned stations:

transmitting a block acknowledgement request from the access point to each assigned station instructed to transmit the delayed block acknowledgement; and at least one of:

receiving, at the access point, a block acknowledgement over all channels of the basic service set from each of the assigned stations instructed to transmit the delayed block acknowledgement upon receiving the block acknowledgement request; or receiving, at the access point, a block acknowledgement over all channels of the basic service set from each of the assigned stations instructed to transmit the immediate block acknowledgement upon receiving the corresponding data unit.

13. An access point comprising:
a transmitter;
a computing device in communication with the transmitter; and
non-transitory memory in communication with the computing device and storing instructions that when executed by the computing device cause the computing to execute operations comprising:
  determining a total bandwidth for a downlink communication;
  segmenting the downlink communication into data units;
  assigning the data units to channels assigned to stations of a basic service set;
  transmitting a channel announce frame to stations of the basic service set, the channel announce frame indicating:
    each station assigned to receive a corresponding data unit; and
    one or more channels assigned to each station for transmitting the corresponding data unit;
  receiving short acknowledgements from one or more of the assigned stations over one or more of the assigned channels, each received short acknowledgment indicating the corresponding assigned station received the channel announce frame;
  determining interference on each assigned station from which a corresponding short acknowledgment is not received;
  blocking transmission of the corresponding data units to each assigned station determined to have interference; and
  transmitting the corresponding data units over the assigned channels to the unblocked assigned stations in a single downlink communication.

14. The access point of claim 13, wherein the operations further comprise determining a number of the data units for segmenting the downlink communication by dividing the total bandwidth for the downlink communication by a predetermined value corresponding to a channel frequency.

15. The access point of claim 13, wherein each data unit is a PHY protocol data unit that comprises a media access control protocol data unit.

16. The access point of claim 15, wherein one or more of the PHY protocol data units comprise a padding appended to the end of the corresponding media access control protocol data units.

17. The access point of claim 13, wherein each station of the basic service set is configured to communicate with the access point over a primary channel.

18. The access point of claim 13, wherein transmitting the channel announce frame to stations of the basic service set comprises transmitting the channel announce to one or more of the stations of the basic service set assigned to receive the corresponding data unit.

19. The access point of claim 18, wherein the operations further comprise transmitting the channel announce to at least one of the stations of the basic service set excluded from being assigned to receive a corresponding data unit.

20. The access point of claim 13, wherein assigning the data units to channels assigned to stations of the basic service set comprises:
  transmitting a request to send frame to one of the stations over all channels of the basic service set;
  receiving a clear to send frame from the station indicating one or more channels indicated as being available for transmitting the data units; and
  assigning each data unit to one or more of the channels indicated as being available for transmitting the corresponding data unit.

21. The access point of claim 13, wherein the operations further comprise decoding the short acknowledgment frame received over a primary one of the assigned channels when determining interference on one or more of the assigned stations.

22. The access point of claim 13, wherein the operations further comprise decoding the short acknowledgements received over all channels when determining interference on one or more of the assigned stations.

23. The access point of claim 13, wherein each data unit transmitted over the assigned channels instructs the corresponding assigned station to transmit one of an immediate block acknowledgement or a delayed block acknowledgement to the access point.

24. The access point of claim 23, wherein after transmitting the corresponding data units over the assigned channels to the assigned stations, the operations further comprise:
  transmitting a block acknowledgement request from the access point to each assigned station instructed to transmit the delayed block acknowledgement; and at least one of:
  receiving a block acknowledgement over all channels of the basic service set from each of the assigned stations instructed to transmit the delayed block acknowledgement in response to receiving the corresponding block acknowledgement request; or
  receiving a block acknowledgement over all channels of the basic service set from each of the assigned stations instructed to transmit the immediate block acknowledgement in response to receiving the corresponding data unit.

* * * * *